(12) United States Patent
Harbour et al.

(10) Patent No.: US 11,231,125 B2
(45) Date of Patent: Jan. 25, 2022

(54) BALL VALVE WITH STEM-CAP ENGAGEMENT

(71) Applicant: Mueller International, LLC, Atlanta, GA (US)

(72) Inventors: Theodore Chad Harbour, Decatur, IL (US); Stephen L. Crawford, Decatur, IL (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 17/104,555

(22) Filed: Nov. 25, 2020

(65) Prior Publication Data

US 2021/0080024 A1 Mar. 18, 2021

Related U.S. Application Data

(63) Continuation of application No. 16/670,903, filed on Oct. 31, 2019, now Pat. No. 10,883,624, which is a continuation of application No. 15/888,679, filed on Feb. 5, 2018, now Pat. No. 10,502,339.

(51) Int. Cl.
*F16K 31/60* (2006.01)
*F16K 5/06* (2006.01)
*F16K 35/06* (2006.01)

(52) U.S. Cl.
CPC ............ *F16K 31/60* (2013.01); *F16K 5/0626* (2013.01); *F16K 5/0647* (2013.01); *F16K 35/06* (2013.01)

(58) Field of Classification Search
CPC ........ F16K 31/60; F16K 5/0626; F16K 35/06; F16K 1/14; F16K 1/48; F16K 1/485; F16K 1/487
See application file for complete search history.

(56) References Cited

U.S. PATENT DOCUMENTS

| 6,050,545 | A | 4/2000 | Stolzman |
| 7,506,665 | B2 * | 3/2009 | Gruener, Sr. ......... F16K 5/0626 137/15.22 |
| 10,502,339 | B2 | 12/2019 | Harbour et al. |
| 10,823,309 | B2 * | 11/2020 | Fang et al. ............ F16K 31/602 |
| 10,883,624 | B2 | 1/2021 | Harbour et al. |
| 2013/0334262 | A1 | 12/2013 | Banning et al. |
| 2016/0096656 | A1 | 4/2016 | Qian et al. |
| 2019/0242492 | A1 | 8/2019 | Harbour et al. |
| 2020/0063888 | A1 | 2/2020 | Harbour et al. |
| 2020/0173577 | A1 | 6/2020 | Kogure |

OTHER PUBLICATIONS

Cambridge Brass; Drawing of Curb Stop—Ball Style for Copper or Plastic Tubing (CTS), published Apr. 2014, 1 pg.
Harbour, Theodore Chad; Non-Final Office Action for U.S. Appl. No. 15/888,679, filed Feb. 5, 2018, dated May 1, 2019, 11 pgs.
(Continued)

*Primary Examiner* — Kevin L Lee
(74) *Attorney, Agent, or Firm* — Taylor English Duma LLP

(57) ABSTRACT

A method of assembling a valve includes inserting a stem of the valve into a valve body of the valve through an end of the valve body, the stem defining a first end engaged with the valve body; securing a fastener to a second end of the stem; and placing a cap of the valve over the second end of the stem, the fastener engaging the cap.

20 Claims, 13 Drawing Sheets

(56) References Cited

OTHER PUBLICATIONS

Harbour, Theodore Chad; Notice of Allowance for U.S. Appl. No. 15/888,679, filed Feb. 5, 2018, dated Aug. 12, 2019, 6 pgs.
McDonald, Submittal Data Sheet for NL Ball Style Curb Stop—74600B-22, publicly available prior to Feb. 5, 2018, 1 pg.
Mueller Co.; Drawing of Angle Meter Valve Low Lead Brass (B24255N), publicly available prior to Feb. 5, 2017, 1 pg.
Mueller Co.; Drawing of Inline Ball Curb Valve—LLB (B25171N), publicly available prior to Feb. 5, 2017, 1 pg.
Mueller Co.; Drawing of Inline Curb Ball Valve Low Lead Bras (B20283N), publicly available prior to Feb. 5, 2017, 1 pg.
Mueller Co.; Drawing of Inline LLB Ball Curve Valve (V25100N), publicly available prior to Feb. 5, 2017, 1 pg.
Mueller Co.; Mueller 300 Product Catalog for Ball Curb Valve, publicly available prior to Feb. 5, 2017, 32 pgs.
Mueller Co.; Mueller 300 Product Catalog for Ball Valves, Copyright 1995, 6 pgs.
Mueller Co.; Mueller 300 Product Catalog for Ball Valves, Copyright 2016, 6 pgs.
Mueller Co.; Mueller 300 Product Specifications for Ball Valves, Copyright 2016, 4 pgs.
The Ford Meter Box Company, Inc.; Submittal Information for Ball Valve curb Stop—(B44-xxx-G-NL style) Grip Joint for copper or Plastic Tubing (CTS) Inlet and Outlet, published Apr. 4, 2017, 1 pg.
Harbour, Theodore Chad; Non-Final Office Action for U.S. Appl. No. 16/670,903, filed Oct. 31, 2019, dated Aug. 5, 2020, 14 pgs.
Harbour, Theodore Chad; Notice of Allowance for U.S. Appl. No. 16/670,903, filed Oct. 31, 2019, dated Oct. 15, 2020, 7 pgs.

\* cited by examiner

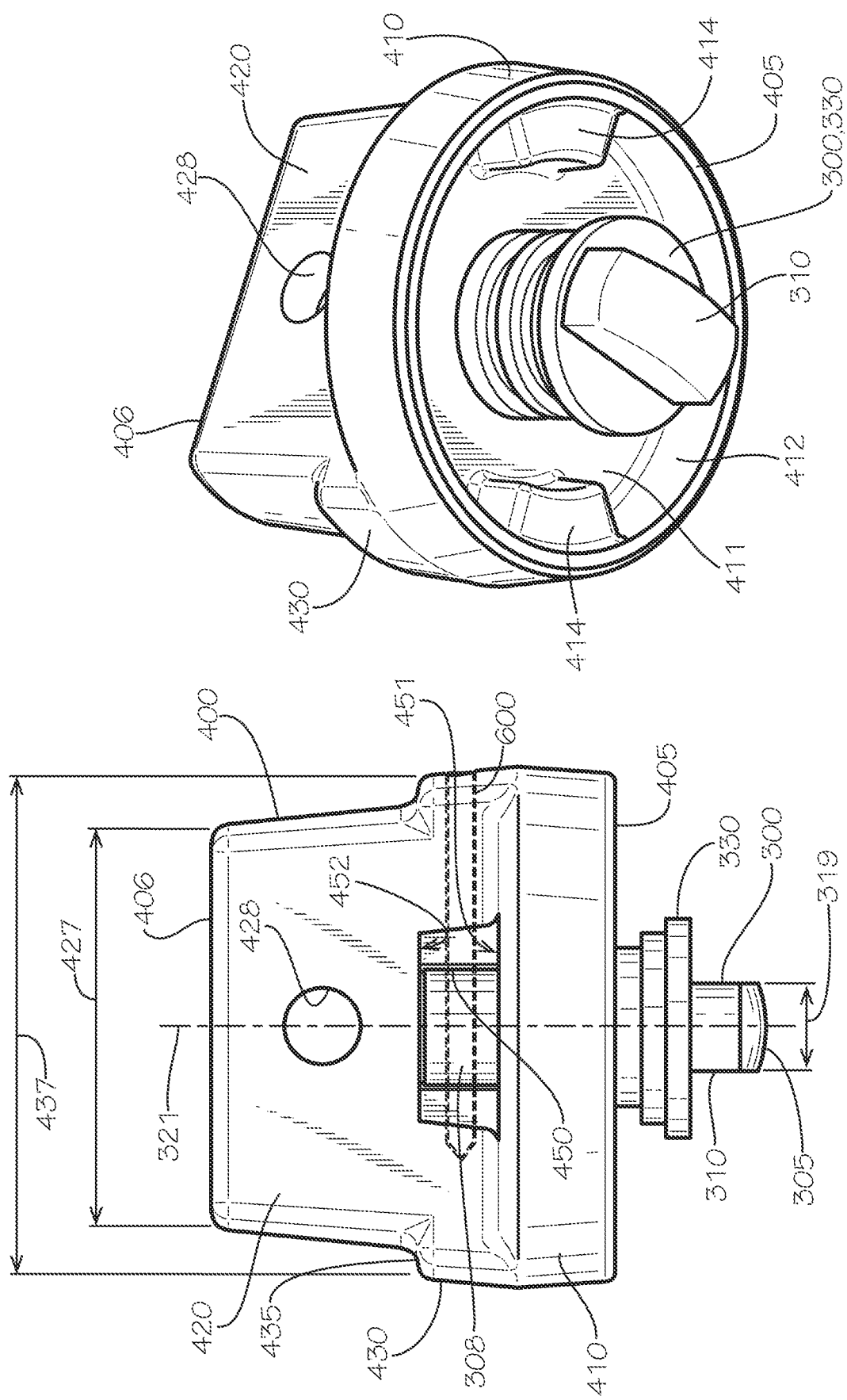

BALL VALVE WITH STEM-CAP ENGAGEMENT

REFERENCE TO RELATED APPLICATIONS

This application is a continuation of U.S. application Ser. No. 16/670,903, filed Oct. 31, 2019, now U.S. Pat. No. 10,883,624, which is a continuation of U.S. application Ser. No. 15/888,679, filed Feb. 5, 2018, which issued into U.S. Pat. No. 10,502,339 on Dec. 10, 2019, both of which are hereby specifically incorporated by reference herein in their entireties.

TECHNICAL FIELD

Field of Use

This disclosure relates to fluid valves. More specifically, this disclosure relates to fluid valves with a cap that is fixed to a stem.

Related Art

A valve such as a curb valve can comprise a cap for rotating a valve sealing element of the valve. The cap can be rotated to open and close the valve. The cap can be connected with the valve sealing element through a stem. A fastener can be used to secure the cap to the stem, but alignment or positioning of the cap with respect to the stem can prove difficult. The alignment or position of the cap with respect to the stem is not generally visible when an end of the stem is hidden inside the cap.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a valve comprising: a valve body defining a first end, a second end, an interior surface, and an exterior surface, the first end defining a first opening and the second end defining a second opening, the interior surface defining a main bore extending from the first opening to the second opening, the main bore defining a fluid path from the first opening to the second opening, the valve body comprising a stem portion defining a stem bore intersecting the main bore; a valve sealing element positioned inside the valve body; a stem positioned inside the stem bore of the valve body, the stem comprising a first end and a second end, the first end of the stem engaged with the valve sealing element; and a cap fixed with respect to the stem and thereby prevented from translational or rotational movement with respect to the stem, the cap comprising a mounting end and an actuating end; the mounting end defining a stem engagement cavity; the actuating end distal from the mounting end; and a fastener blindly engaged with the second end of the stem with the stem engagement cavity, engagement of the second end of the stem with the stem engagement cavity indicated by one of a sound and a tactile feel of the fastener snapping into engagement with the stem engagement cavity.

In a further aspect, disclosed is a cap for a valve, the cap comprising: a mounting end defining a lower cavity and a stem engagement cavity therein, the stem engagement cavity defining a groove sized to receive a snap ring of a stem of the valve; and an actuating end distal from the mounting end.

In yet another aspect, disclosed is a method of assembling a valve, the method comprising: inserting a stem of the valve into a valve body of the valve through an end of the valve body, the stem defining a first end engaged with the valve body; securing a fastener to a second end of the stem; and placing a cap of the valve over the second end of the stem, the fastener engaging the cap.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

FIG. 2 is a front view of a cap and a stem of the valve of FIG. 1 in accordance with another aspect of the current disclosure.

FIG. 3 is a bottom perspective view of the cap and the stem of FIG. 2.

DETAILED DESCRIPTION

Figure 1:
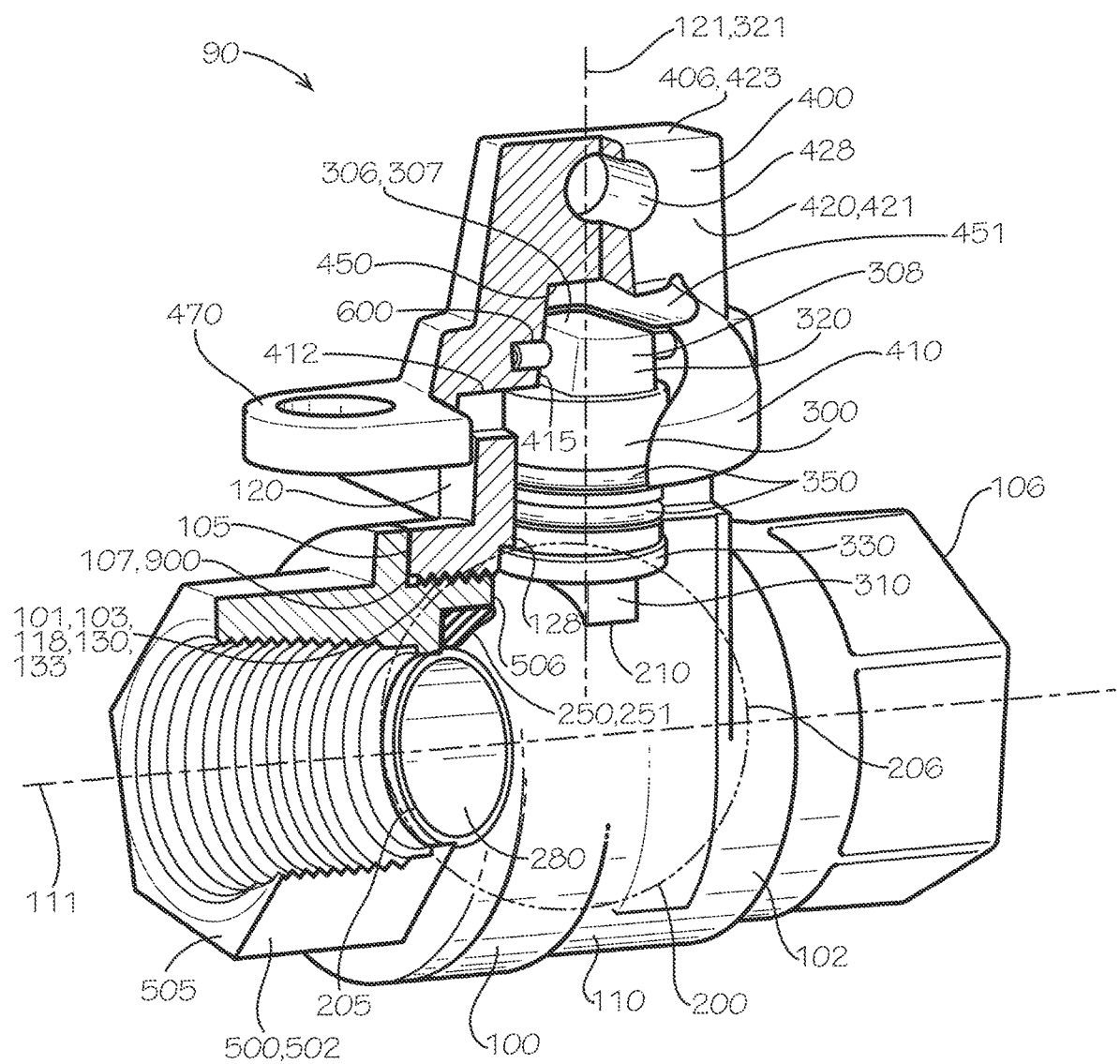
FIG. 1 is a partial sectional front perspective view of a valve in accordance with one aspect of the current disclosure.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise.

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list.

To simplify the description of various elements of the valve disclosed herein, the conventions of "top," "bottom," "inner," "outer," "inside," or "outside," may be referenced. Unless stated otherwise here or in the figures, "top" describes that side or end of the valve that is facing upward as shown in the figures and "bottom" is that side or end of the valve that is opposite or distal the top of the valve and is facing downward as shown in the figures. Likewise, "outer" describes that side of the valve that is facing outward and "inner" is that side of the valve that is facing inward.

In one aspect, a cap for a valve and associated methods, systems, devices, and various apparatuses are disclosed herein. In one aspect, the cap can define a window, which can expose a stem of the valve or can reduce the weight and material cost of the cap or can accomplish both purposes and other purposes as well.

As shown in FIG. 1, a valve 90 can comprise a valve body 100, a valve sealing element 200, a stem 300, a cap 400, and an end piece 500. The valve body 100 can define a first end 105 and a second end 106, which can be distal from the first end 105. The first end 105 can define a first opening 107, which can be an inlet or an outlet of the valve body 100 and the valve 90. The second end 106 can define a second opening, which can likewise be an inlet or an outlet of the valve body 100 and the valve 90. The valve body 100 can further define an interior surface 101 and an exterior surface 102. The interior surface 101 can define an interior cavity 103.

The valve body 100 can further define a main portion 110 defining a main bore 118 extending from the first end 105 to the second end 106, and the main bore 118 can define a main bore axis 111. The main bore 118 can define a fluid path from the first opening 107 to the second opening. The valve body 100 can comprise a stem portion 120, which can define a stem bore 128. The stem bore 128 can intersect the main bore 118. The stem bore 128 can define a stem bore axis 121. In some aspects, as shown, the stem bore 128 and the stem bore axis 121 can be angled with respect to at least a portion of the main bore 118 and the main bore axis 111. In other aspects, including when the valve 90 is an angle valve in which a portion of the main bore axis 111 proximate to the second end 106 is angled at 90 degrees with respect to a portion of the main bore axis 111 proximate to the first end 105, the stem bore 128 and the stem bore axis 121 can be aligned with respect to or parallel to at least a portion of the main bore 118 and the main bore axis 111. The valve body 100 can define a first end connection 130, which can define first threads 133. The valve body 100 can likewise define a second end connection (not shown), which can define second threads (not shown).

In some aspects, a circumferential portion of the exterior surface 102 of the valve body 100 proximate to the second end 106 can define a hexagonal shape. The hexagonal shape can be configured to be engaged by a wrench (not shown) able to fix the position of the valve body 100 about the main bore axis 111 with respect to a pipe element (not shown) to which the valve body 100 can be secured or assembled. In other aspects, a circumferential portion of the exterior surface 102 of the valve body 100 proximate to the second end 106 can define a shape other than that which is hexagonal that can nonetheless facilitate the fixing of the position of the valve body 100 about the main bore axis 111 with respect to the pipe element or another mating component. For example and without limitation, the circumferential portion of the exterior surface 102 of the valve body 100 proximate to the second end 106 can define another polygonal shape, knurls, ribs, knobs, or even a non-slip surface applied to or forming the exterior surface 102. In other aspects, the circumferential portion of the exterior surface 102 of the valve body 100 proximate to the second end 106 can define a plain or circular end. The valve body 100 can likewise define the same or similar features on or in a circumferential portion of the exterior surface 102 proximate to the first end 105.

The valve sealing element 200 can be used to effectively open and close the valve 90 to allow or inhibit (i.e., control) flow of a fluid through the main bore 118. Such opening and closing of the valve 90 can be directly caused by the valve sealing element 200 in that the flow of the fluid will be directly impeded by the valve sealing element 200. The valve sealing element 200 can be positioned completely inside and enclosed by the valve body 100. The valve sealing element 200 can define a first end 205 and a second end 206, which can be distal from the first end 205. The valve sealing element 200 can be any structure able to selectively unseal and seal, i.e., open and close, the valve 90 including structures such as, for example and without limitation, a ball and a disc. In some aspects including when the valve sealing element 200 is a ball, the valve sealing element 200 can define a bore 280 through which the fluid can be allowed to pass from the first end 205 to the second end 206 when the valve 90 is open. In other aspects including when the valve sealing element 200 is a disc, the fluid can be allowed to simply bypass the valve sealing element 200. The valve sealing element 200 can define a stem recess 210, which can be positioned between the first end 205 and the second end 206 and can be proximate to the stem bore 128 of the valve body 100. The valve sealing element 200 can comprise a coating, which can be a low-friction coating such as, for example and without limitation, a fluorocarbon coating, to facilitate smooth rotation of the valve sealing element and thereby smooth opening and closing of the valve 90. The fluorocarbon coating can comprise polytetrafluoroethylene (PTFE).

In some aspects, the valve 90 can be a straight or inline valve as shown. In an inline valve, the main bore axis 111 extends from the first end 105 to the second end 106 and can be defined by the first opening 107 and the second opening. In other aspects, the valve can be an angle valve such that an axis defined by the main bore 118 at the second end 106 is angled with respect to an axis defined by the main bore 118 at the first end 105. The valve 90 can be a curb valve. In some aspects, the cap 400 can rotate a quarter-turn to open or close the valve 90. In other aspects, the cap 400 can rotate a full 360 degrees or more.

The valve 90 can further comprise a seal 250, which can be configured to seal a space or gap between the valve sealing element 200 and the valve body 100. In some aspects, multiples seals 250 can be used such that, for example and without limitation, a seal such as the seal 250 is positioned in each area of potential leakage past the valve sealing element 200. In some aspects, as shown, the seal 250 can be positioned between a second end 506 of the end piece 500, which can define a first end 505 distal from the second end 506. and the valve sealing element 200 proximate to the first end 205 of the valve sealing element 200. In other aspects, the seal 250 can be positioned between the valve body 100 and the valve sealing element 200. In some aspects, a second seal can be positioned between the valve body 100 and the valve sealing element 200 proximate to the second end 206 of the valve sealing element 200. In some aspects, the seal 250 and any additional seals can comprise an elastomeric sealing material such as, for example and without limitation, Buna-N rubber (i.e., nitrile), ethylene propylene diene monomer (EPDM) rubber, or silicone. In other aspects, the seal 250 and any additional seals can comprise a non-elastomeric material. The seal 250 and any additional seals can define an annular shape. The seal 250 can define a sealing surface 251 facing the valve sealing element 200. The sealing surface 251 can be frustoconical or partially spherical in shape and can be angled or curved in cross-section.

The stem 300 of the valve 90 can be positioned inside the stem bore 128. The stem 300 can comprise a first end 305 (shown in FIG. 2) defining an end surface 307 and a second end 306. The stem 300 can further define a stem axis 321. The stem 300 can further define a side outer surface 308, which can face radially outward relative to the stem bore axis 121. The first end 305 of the stem 300 can be positioned inside the interior cavity 103 of the valve body 100 and can define a first key 310, while the second end 306 can extend beyond the exterior surface 102 of the valve body 100 and can define a second key 320. The first key 310 of the first end 305 of the stem 300 can be positioned inside the stem recess 210 of the valve sealing element 200 and can thereby be engaged with the valve sealing element 200. The stem 300 can define a plurality of annular grooves 370 (shown in FIG. 4). The stem 300 can define a first flange 330, which can be positioned proximate to the first end 305. In some aspects, the first flange 330 can be a lip or a ledge extending in a direction angled with respect to the axis 321. A diameter 337 (shown in FIG. 6) of the first flange 330 can be larger than a bore diameter (not shown) of the stem bore 228, in which case the first end 305 of the stem 300 can be held captive inside the valve body 100 such that the stem 300 cannot be removed from the valve body 100 through the stem bore 128. In other words, the stem 300 can thereby be made blow-out-proof. Where the stem 300 is not blow-out proof, such as by not being held captive inside the valve body 100, failure of a fastener used to secure the cap 400 to the stem 300 can result in the cap 400 and/or the stem 300 becoming a projectile when a fluid inside the valve 90 is under pressure.

The stem 300 can further comprise a plurality of stem O-rings 350. The quantity of the stem O-rings 350 can match the quantity of the plurality of annular grooves 370 in the stem 300. Further, each of the plurality of stem O-rings 350 can be positioned within a one of the annular grooves 370 of the stem 300. Each of the plurality of stem O-rings 350 can comprise a flexible or elastomeric material such as, for example and without limitation, an EPDM material. In some aspects, each of the plurality of stem O-rings 350 can have a circular cross-section. In other aspects, each of the plurality of stem O-rings 350 can have any other desirable cross-section.

The cap 400 can comprise a first end, which can be a mounting end 405 (shown in FIG. 2), and a second end, which can be an actuating end 406. The mounting end 405 can define a base 410 defining a lower cavity 412 and a stem engagement cavity 415 therein. The actuating end 406 can be distal from the mounting end 405. The actuating end 406 can comprise a rotation tab 420. In some aspects, the rotation tab 420 can define each of a first side surface 421, a second side surface 422 (shown in FIG. 5), and a top surface 423. In other aspects, the rotation tab 420 can define less than all of the first side surface 421, the second side surface 422, and the top surface 423. In other aspects, the rotation tab 420 can define additional surfaces. The rotation tab 420 can define an engagement hole 428, which can be used to rotate the cap 400 relative to the valve body 100, including indirectly with a tool such as a hook on one end of a pole when the valve 90 is positioned at a distance from a person accessing the valve 90, such as in a curb box.

Figure 7:
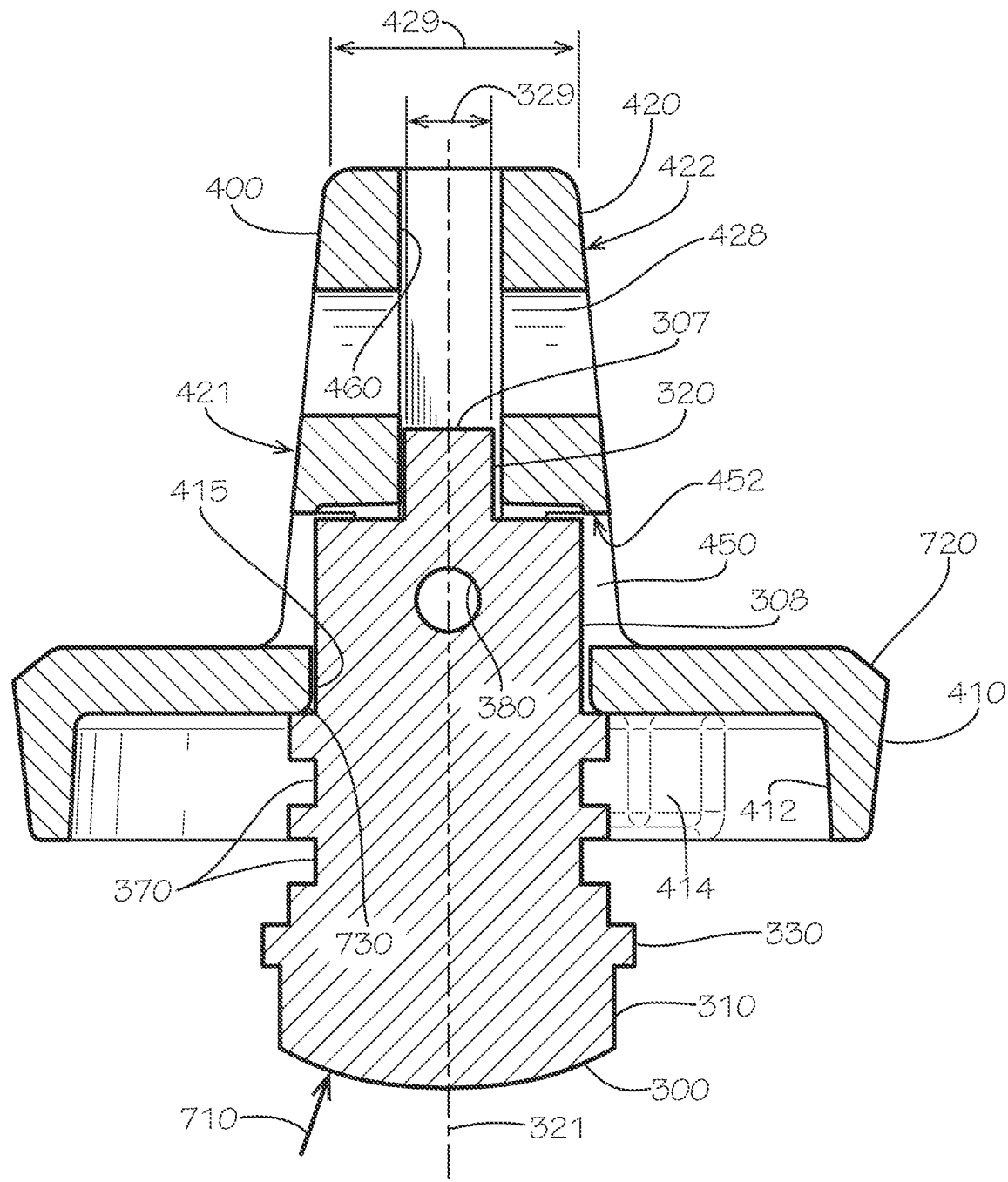
FIG. 7 is a sectional view of the cap and the stem of FIG. 2 taken along line 7-7 of FIG. 5.

The cap 400 can further define a first window 450 and/or a second window 460 (shown in FIG. 4) between the mounting end 405 and the actuating end 406. Either of the first window or the second window 460 can be considered an aperture or an opening in the cap 400. Either of the first window 450 and the second window 460 can expose a surface of the stem 300. More specifically, either of the first window 450 and the second window 460 can expose a surface of the stem 300 distal from the second end 306 of the stem 300. The first window 450 can extend from the first side surface 421 of the rotation tab 420 to the second side surface 422 of the rotation tab 420. The second window 460 can extend from the top surface 423 of the rotation tab 420 and can intersect the first window 450 (as shown in FIG. 7). In some aspects, the cap 400 can comprise a locking tab 470, which can be used to lock the valve 90 in an open position or a closed position. In other aspects, any other method can be used to lock the valve 90, or the valve 90 can lack a locking feature. As shown, an orientation of the rotation tab 420 can be oriented in the same direction as the main bore axis 111 when the valve 90 is in the open position and can be angled with respect to the main bore axis 111 when the valve 90 is in the closed position.

Either of the first window 450 or the second window 460 can be incorporated into the cap 400 for various reasons including, for example and without limitation, to facilitate proper alignment and assembly of the stem 300 and the cap 400 as described herein, to reduce the amount of material required to form the cap 400, for aesthetics, or for a combination of any one of these and other desirable aspects.

The end piece 500 can be connected to first end 105 of the valve body 100. More specifically, threads 533 of an end connection 530 of the end piece 500 can engage the first threads 133 of the first end connection 130 proximate to the first end 105 of the valve body 100. The end piece 500 can define the first end 505 and the second end 506. In some aspects, a circumferential portion of an exterior surface 502 of the end piece 500 proximate to the first end 505 can define a hexagonal shape. The hexagonal shape can be configured to be engaged by a wrench (not shown) able to fix the position of the end piece 500 relative to the valve body 100 about the main bore axis 111 with respect to the valve body 100 to which the end piece 500 can be secured or assembled. In other aspects, a circumferential portion of the exterior surface 502 of the valve body 100 proximate to the first end 505 can define a shape other than that which is hexagonal that can nonetheless facilitate the fixing of the position of the end piece 500 about the main bore axis 111 with respect to the valve body 100 or another mating component. For example and without limitation, the circumferential portion of the exterior surface 502 of the end piece 500 proximate to the first end 505 can define another polygonal shape, knurls, ribs, knobs, or even a non-slip surface applied to or forming the exterior surface 502. In other aspects, the circumferential portion of the exterior surface 502 of the end piece 500 proximate to the first end 505 can define a plain or circular end.

In some aspects, the valve 90 can be a ball valve. In other aspects, the valve 90 can be any other kind of valve, such as a butterfly valve or gate valve. In some aspects, the valve 90 can be configured to withstand 300 psi of internal fluid pressure. In other aspects, the valve 90 can be configured to withstand more or less than 300 psi of internal fluid pressure.

The valve 90 can further comprise a fastener 600. In some aspects, the fastener 600 can be a pin, which can extend at least partly through a pin assembly hole 480 (shown in FIG. 4) in the cap 400 and a pin assembly hole 380 (also shown in FIG. 4) in the stem 300 to join the cap 400 to the stem 300. In other aspects, as will be described, the fastener 600 can be any other type of fastener including, for example and without limitation, a snap ring. The fastener 600 can be angled at 90 degrees with respect to the stem 300. The fastener 600 can secure the cap 400 to the stem 300. The pin assembly hole 480 in the cap 400 and the pin assembly hole 380 in the stem 300 can be positioned to minimize freedom of movement of the stem 300 after assembly of the cap 400 to the stem 300.

The valve 90 can further comprise a body O-ring 900, which can be positioned between the valve body 100 and the end piece 500 and can be configured to seal a connection between the valve body 100 and the end piece 500. The body O-ring 900 can comprise a flexible or elastomeric material such as, for example and without limitation, an EPDM material. In some aspects, the body O-ring 900 can have a circular cross-section. In other aspects, the body O-ring 900 can have any other desirable cross-section.

Also as shown in FIG. 1, when the cap 400 is assembled to the stem 300, the end surface 307 of the stem 300 can be visible through the first window 450 defined in the cap 400. More specifically, the stem 300 and the cap 400 can be sized and otherwise configured such that the end surface 307 is flush with a bottom surface 451 of the first window 450. As will be described below, such a configuration can indicate to one assembling, installing, or inspecting the valve 90 that the cap 400 is properly positioned with respect to the stem 300 along the axes 121,321.

As shown in FIG. 2, which shows the cap 400 assembled to the stem 300 in accordance with another aspect of the disclosure, the side outer surface 308 of the stem 300 can be visible through the first window 450 defined in the cap 400. In some aspects, the stem 300 and the cap 400 can be sized and otherwise configured such that the end surface 307 (shown in FIG. 7) extends past the bottom surface 451 of the first window 450. In other aspects, the stem 300 and the cap 400 can be sized and otherwise configured such that the end surface 307 (shown in FIG. 7) extends past a top surface 452 of the first window 450. As will be described below, such a configuration can indicate to one assembling, installing, or inspecting the valve 90 that the cap 400 is properly positioned with respect to the stem 300 along the axes 121,321.

The rotation tab 420 of the cap 400 can extend from the base 410. The base 410 can define a diameter 417 (shown in FIG. 5) that can be greater than a width 427 of the rotation tab 420 measured in the same direction as an orientation of the rotation tab 420. Similarly, the base 410 can be larger in diameter than a thickness 429 (shown in FIG. 7) of the rotation tab 420 measured in a direction orthogonal to an orientation of the rotation tab 420. The cap 400 can further define a transition portion 430 between the base 410 and the rotation tab 420. The transition portion 430 can define a width 437 that is smaller in diameter than a width 427 of the rotation tab 420 measured in the same direction as an orientation of the rotation tab 420 and smaller than the diameter 417 of the base 410. A thickness 439 (shown in FIG. 5) of the transition portion 430 can be larger than the thickness 429 (shown in FIG. 7) of the rotation tab 420. In some aspects, the transition portion 430 can be wider or thicker—or wider and thicker—than the rotation tab 420 to increase the strength of a portion of the cap 400 through which a length of the fastener 600 extends or to facilitate installation of the fastener 600—by the use of a smaller angle or shorter height of any draft or taper on the transition portion 430. In other aspects, the transition portion 430 can be wider and thicker than the rotation tab 420 for aesthetic reasons. The cap 400 can define a step 435 at an intersection between the rotation tab 420 and the transition portion 430. As shown, the first key 310 of the stem 300 can define flat sides defining a thickness 319 that can be less than or equal to a thickness (not shown) of the stem recess 210 of the valve sealing element 200.

Each of the base 410, the rotation tab 420, the transition portion 430, and any other portion or surface of the cap 400 can be drafted or tapered to facilitate manufacturing such as by a molding or a casting process. As shown, the first window 450 can define a substantially trapezoidal shape in cross-section including at the first side surface that can transition to a rectangular shape in cross-section where the stem 300 intersects the first window 450. As with other features of the cap 400, the first window 450 can also be drafted or tapered to facilitate manufacturing such as by a molding or a casting process.

As shown in FIG. 3, the base 410 of the cap 400 can define the lower cavity 412, which can be sized to receive or fit around the stem portion 120 (shown in FIG. 1) of the valve body 100. In some aspects, the lower cavity 412, which can define an inner surface 411, can also define a single stop 414 or a plurality of stops 414. The stop 414 can serve to limit rotation of the cap 400—and therefore also the stem 300 and the valve sealing element 200 to which the stem 300 and, indirectly, the cap 400 are connected—between the open position and the closed position of the valve 90. In other aspects, the cap need not comprise any stops; thus in some aspects the cap can rotate a full 360 degrees or more about the valve body 100.

Figure 4:
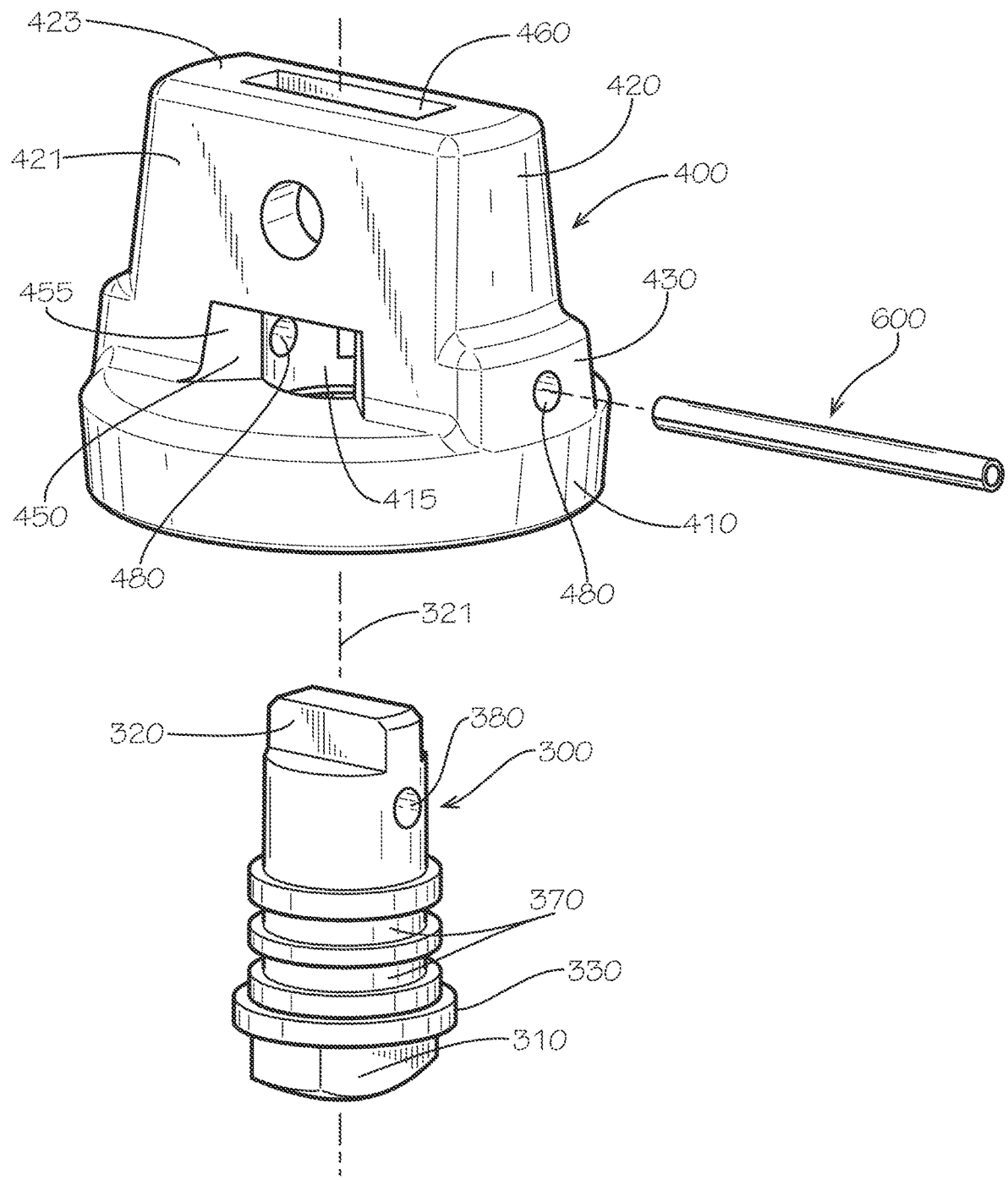
FIG. 4 is a front exploded perspective view of the cap and the stem of FIG. 2.

As shown in FIG. 4, in some aspects the first window 450 can comprise a blend 455 to increase visibility of the stem 300 through the first window 450 after assembly of the stem 300 and the cap 400. In some aspects, the fastener 600 can be a split pin and can also be hollow. In other aspects, the fastener 600 can be a solid pin.

Figure 5:
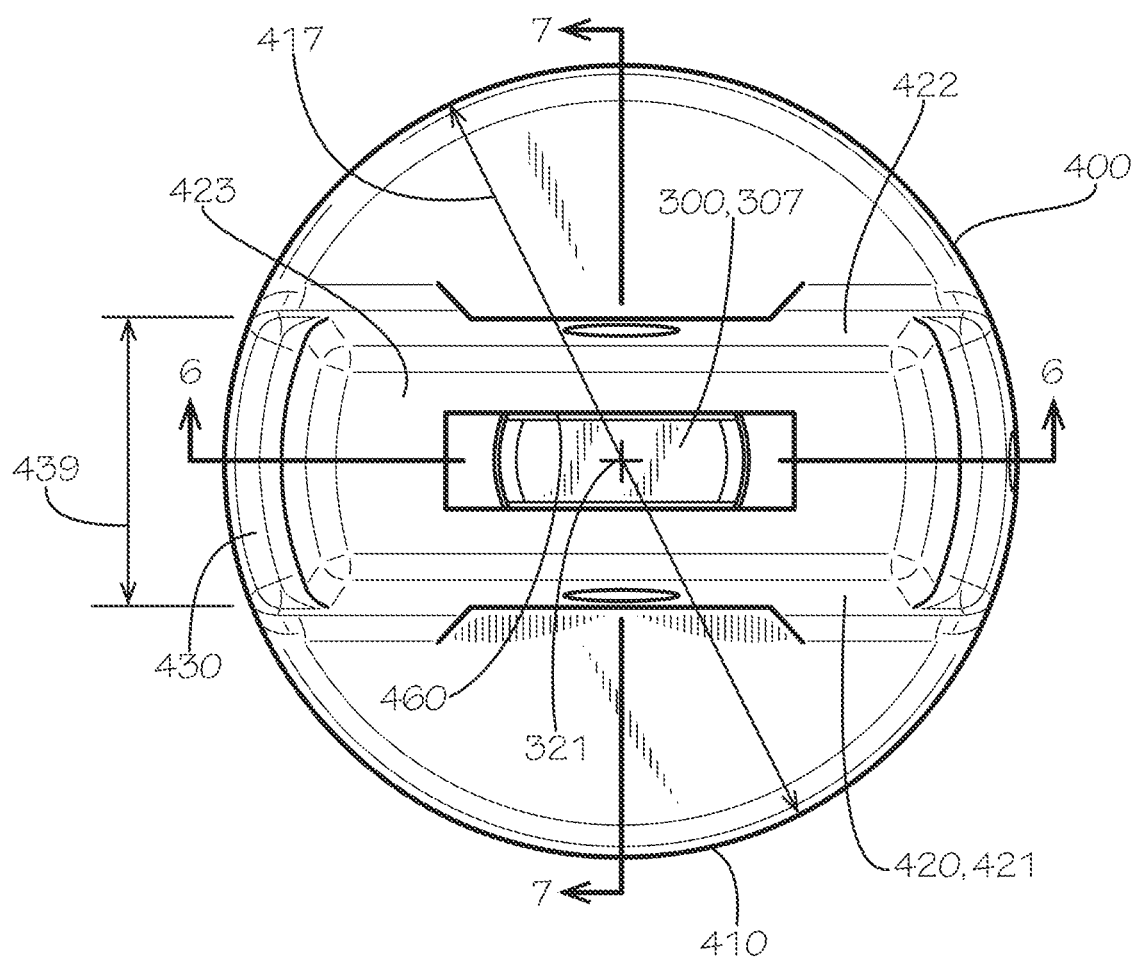
FIG. 5 is a top view of the cap and the stem of FIG. 2.

As shown in FIG. 5, the end surface 307 of the stem 300 can be visible through the second window 460 of the cap 400. In some aspects, as shown, the cap 400 can have a circular shape with the diameter 417. In other aspects, the cap 400 can have any other desirable shape, including various polygonal or rounded shapes. As shown, the second window 460 can define a substantially rectangular shape in cross-section including at the top surface 423. As with other features of the cap 400, the second window 460 can also be drafted or tapered to facilitate manufacturing such as by a molding or a casting process.

Figure 6:
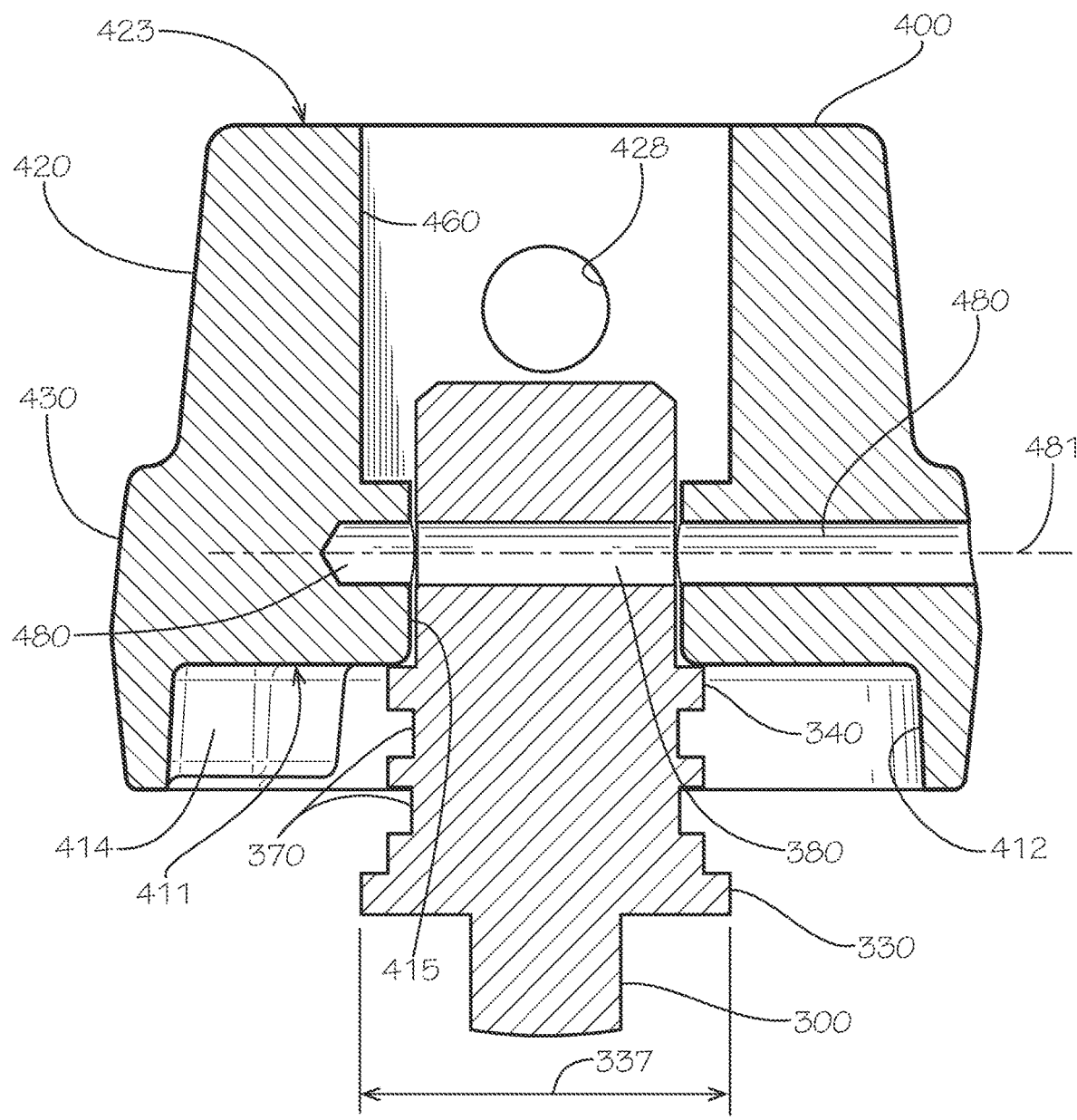
FIG. 6 is a sectional view of the cap and the stem of FIG. 2 taken along line 6-6 of FIG. 5.

As shown in FIG. 6, the pin assembly hole 480 in the cap 400 and the pin assembly hole 380 in the stem 300 can be aligned along a hole axis 481 and the fastener 600 inserted through both to join the cap 400 to the stem 300. In some aspects, as shown, the pin assembly hole 480 can extend partially through the cap 400. For example and without limitation, the pin assembly hole 480 can be a blind hole defined in the cap 400. In other aspects, the pin assembly hole 480 can extend completely through the cap 400. In some aspects, the pin assembly hole 480 in the cap 400 and the pin assembly hole 380 in the stem 300 can be drilled together after insertion of the stem 300 into the cap 400. Drilling the pin assembly holes 380,480 after assembly of the stem 300 and the cap 400 can be advantageous when there is variation in the exact size or relative location of any one of the components of the valve 90 including the valve body 100. For proper drilling of the pin assembly hole 480 in the cap 400 and the pin assembly hole 380 in the stem 300, proper positioning of the stem 300 with respect to the cap 400 along the axis 321 can be beneficial. Such proper positioning can be facilitated by the presence of the first window 450 or the second window 460 and a configuration of the stem 300 that allows either the end surface 307, the side outer surface 308, or another portion of the stem 300 to be visible through the first window 450 or the second window 460. Proper positioning can also be facilitated by incorporation of a second flange 340 into the stem 300. The second flange 340 can contact the inner surface 411 of the lower cavity 412 and thereby fix the position of the stem 300 with respect to the cap 400. In other aspects, the pin assembly hole 480 in the cap 400 and the pin assembly hole 380 in the stem 300 can be formed during individual manufacture of each of the stem 300 and the cap 400. In some aspects, the pin assembly hole 480 in the cap 400 and the pin assembly hole 380 in the stem 300 can be formed during individual manufacture of each of the stem 300 and the cap 400 and then enlarged together after insertion of the stem 300 into the cap 400.

In some aspects, the pin assembly hole 480 in the cap 400 and the pin assembly hole 380 in the stem 300 can define a hole diameter that is equal to an outer diameter of the fastener 600. In other aspects, the pin assembly hole 480 in the cap 400 and the pin assembly hole 380 in the stem 300 can define a hole diameter that is slightly greater than (for a looser fit) or slightly less than (for a tighter fit) the outer diameter of the fastener 600.

As shown in FIG. 7, the second key 320 of the stem 300 can fit inside and be visible through the second window 460 of the cap 400. Simultaneously, the side outer surface 308 of the stem 300 can be visible through the first window 450. As shown, the first key 310 of the stem 300 can define a radius 710 in cross-section, and the stem recess 210 of the valve sealing element 200 can be shaped to match. As shown, the second key 320 of the stem 300 can define flat sides defining a thickness 329 that can be less than or equal to a thickness (not shown) of the second window 460 of the cap 400. The base 410 of the cap 400 can further define an outside edge 720, which can be rounded or chamfered or otherwise relieved. The base 410 of the cap 400 can further define an inside edge 730, which itself can be rounded or chamfered or otherwise relieved. Either of the outside edge 720 or the inside edge 730 can be incorporated for various reasons including, for example and without limitation, to facilitate assembly of the stem 300 and the cap 400, to improve safety by the removal of sharp edges, to reduce the amount of material required to form the cap 400, for aesthetics, or for a combination of any one of these and other desirable aspects.

Figure 8:
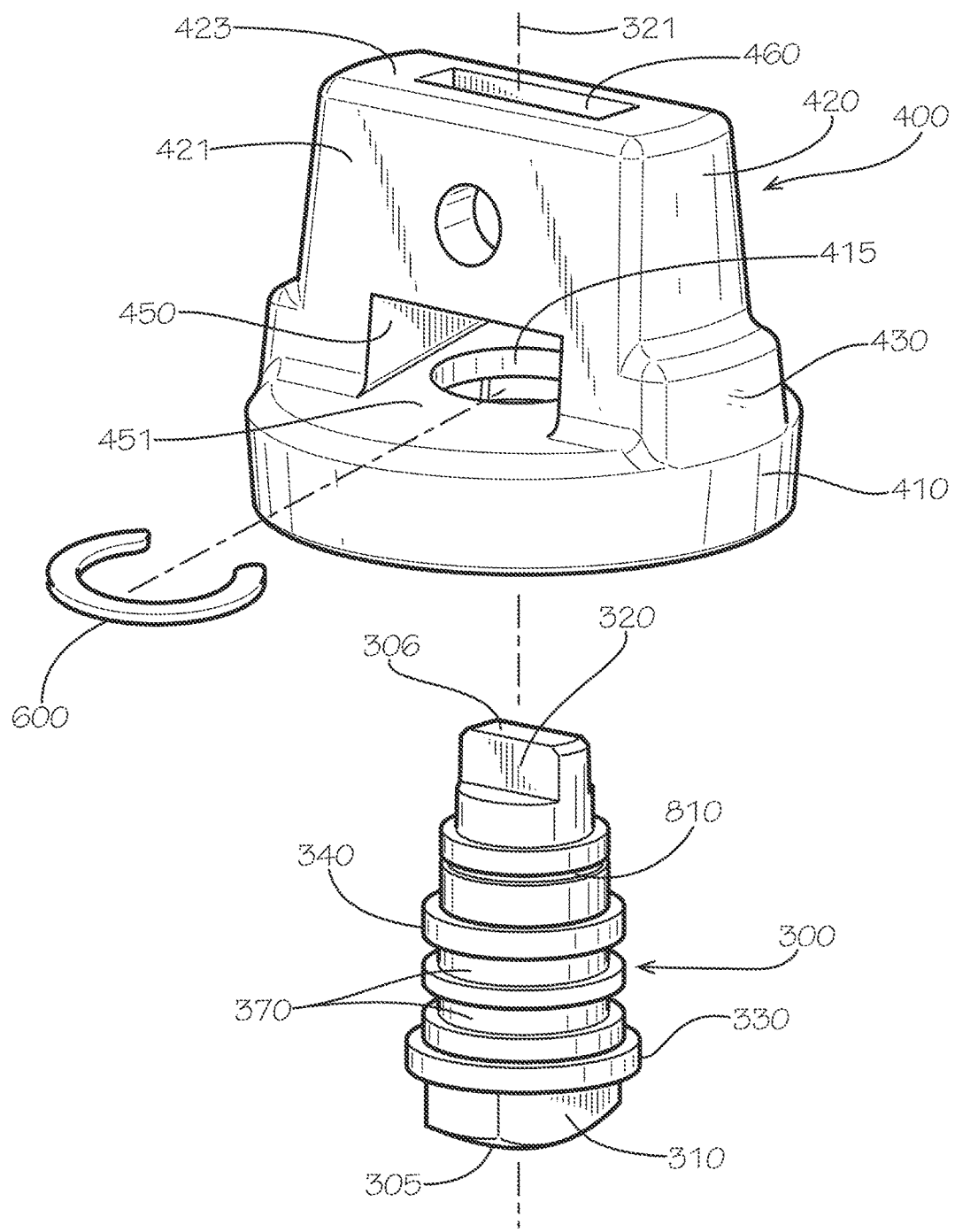
FIG. 8 is a front exploded perspective view of the cap and the stem of the valve of FIG. 1 in accordance with another aspect of the current disclosure.
Figure 9:
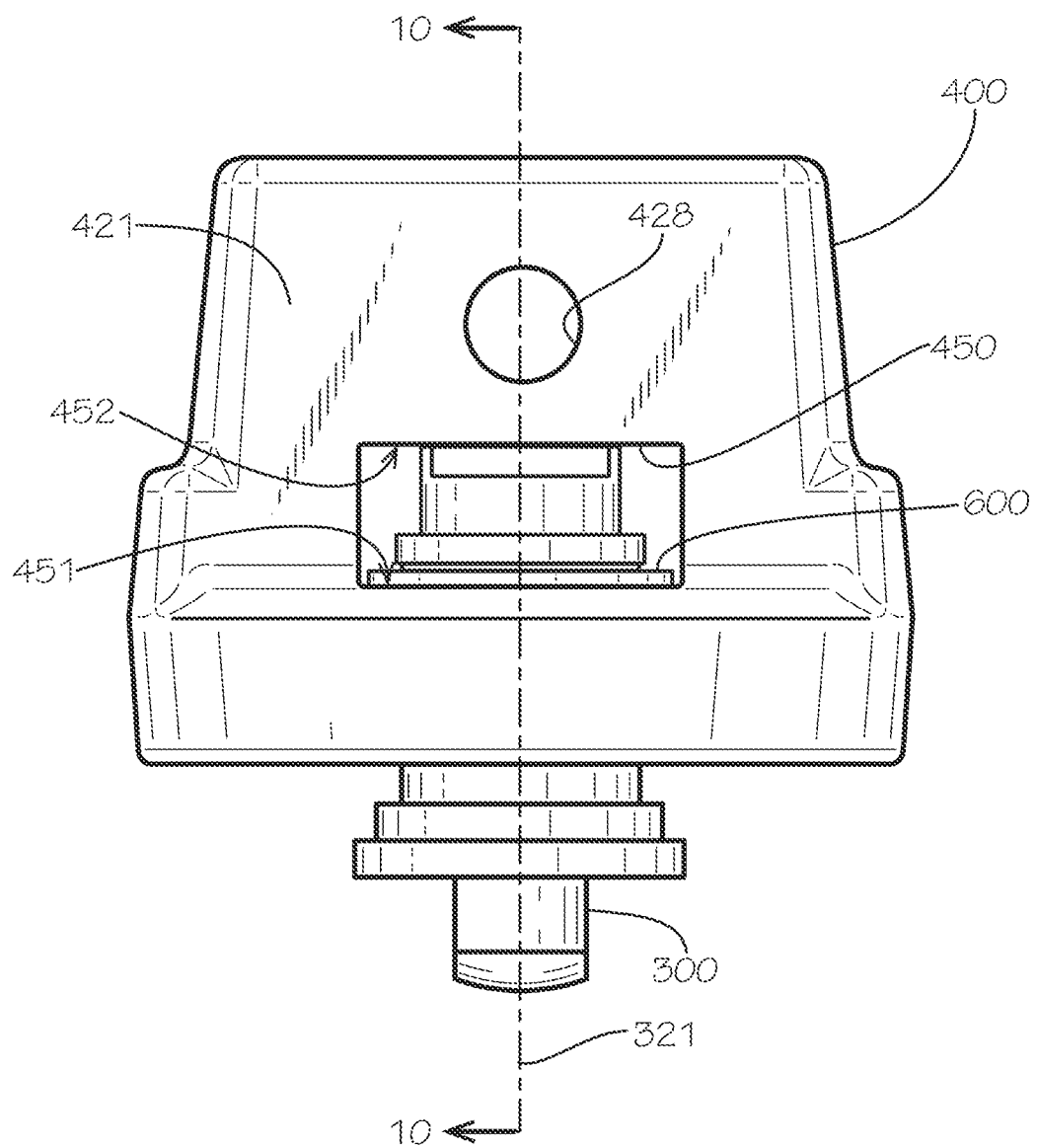
FIG. 9 is a front view of the cap and the stem of FIG. 8.
Figure 10:
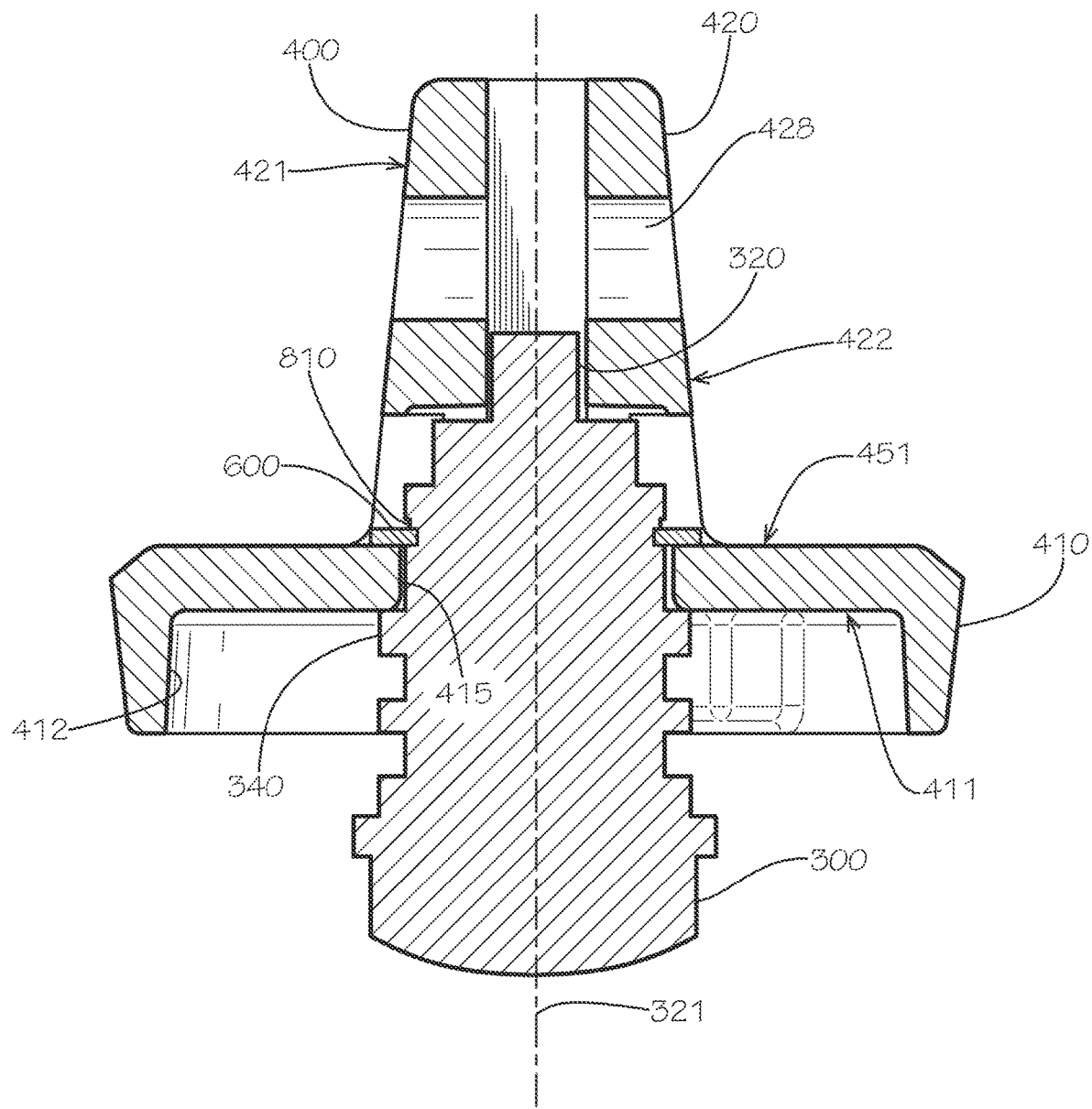
FIG. 10 is a sectional view of the cap and the stem of FIG. 8 taken along line 10-10 of FIG. 9.

A combination of the cap 400 and the stem 300 according to another aspect of the disclosure is shown in FIGS. 8-10. As shown in FIG. 8, the cap 400 and the stem 300 of the valve 90 can be secured to each other with the fastener 600, which can be a retaining ring or snap ring. For example and without limitation, the fastener 600 can be a side-mount external retaining ring as shown, and the stem 300 can define a groove 810 that can be sized to receive the fastener 600.

As shown in FIGS. 9 and 10, the stem 300 can be installed inside the cap 400 including through the stem engagement cavity 415, and the retaining ring can be positioned inside the groove 810. After assembly, the second flange 340 of the stem 300 can contact the inner surface 411 of the cavity 412 of the cap 400, and a lower surface of the fastener 600 (i.e., a lower surface of the retaining ring) can contact the bottom surface 451 of the first window 450. The second end 306 can fit into and, optionally as shown, completely through the stem engagement cavity 415 and optionally extend into the first window 450, while the second flange 340 (shown in FIG. 10) can be sized to not fit into or through the stem engagement cavity 415. The fastener 600 or the second flange 340 or both the fastener 600 and the second flange 340 can thereby hold the cap 400 captive to the stem 300. As shown, the first window 450 can define a substantially rectangular shape in cross-section and can extend from the first side surface 421 to the second side surface 422 (shown in FIG. 10).

Figure 12:
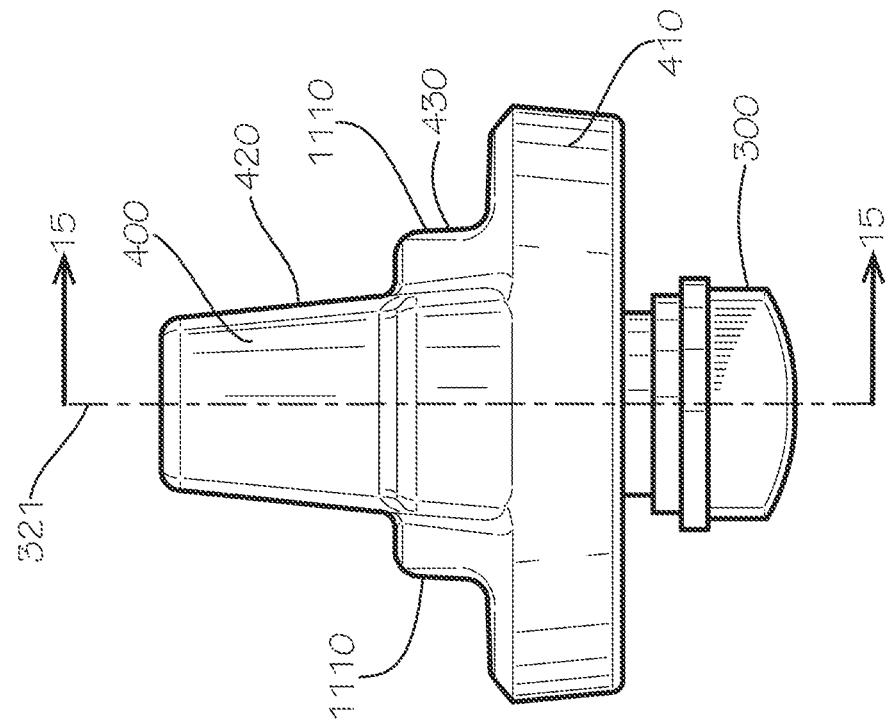
FIG. 12 is a side view of the cap and the stem of FIG. 11.
Figure 11:
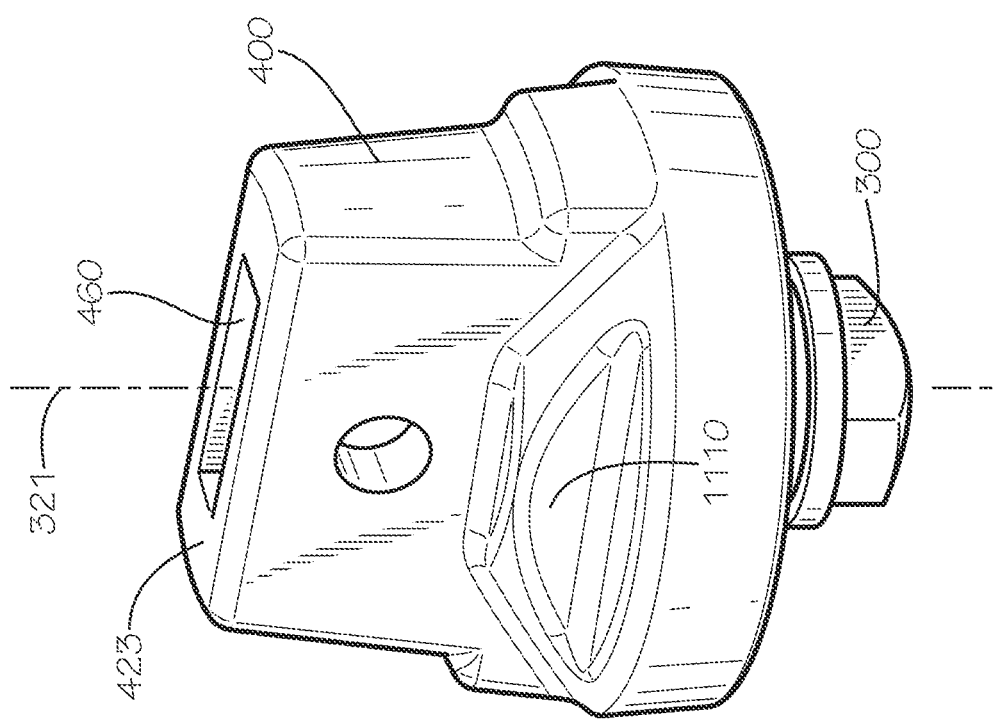
FIG. 11 is a front perspective view of the cap and the stem of the valve of FIG. 1 in accordance with another aspect of the current disclosure.
Figure 13:
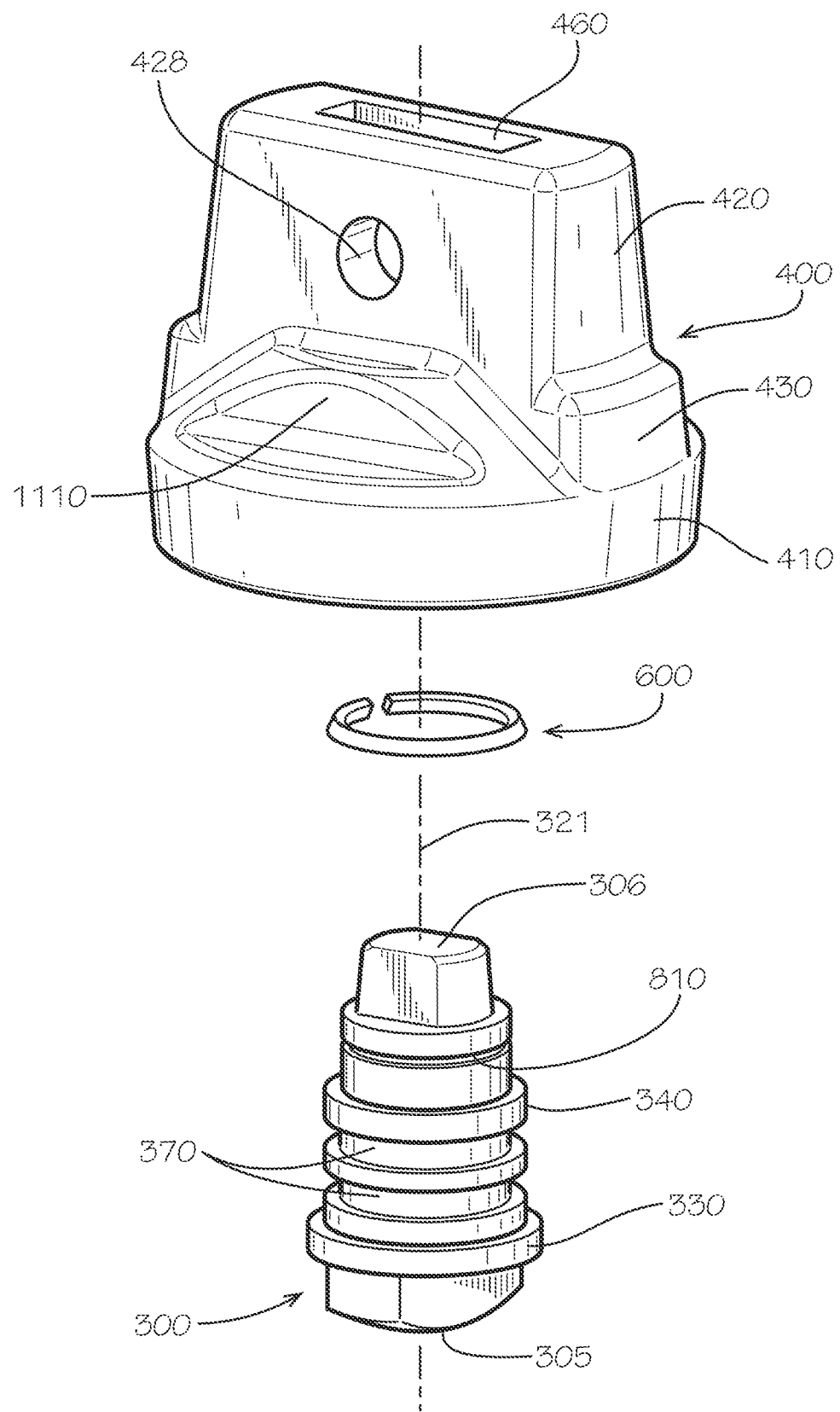
FIG. 13 is a front exploded perspective view of the cap and the stem of FIG. 11.
Figure 14:
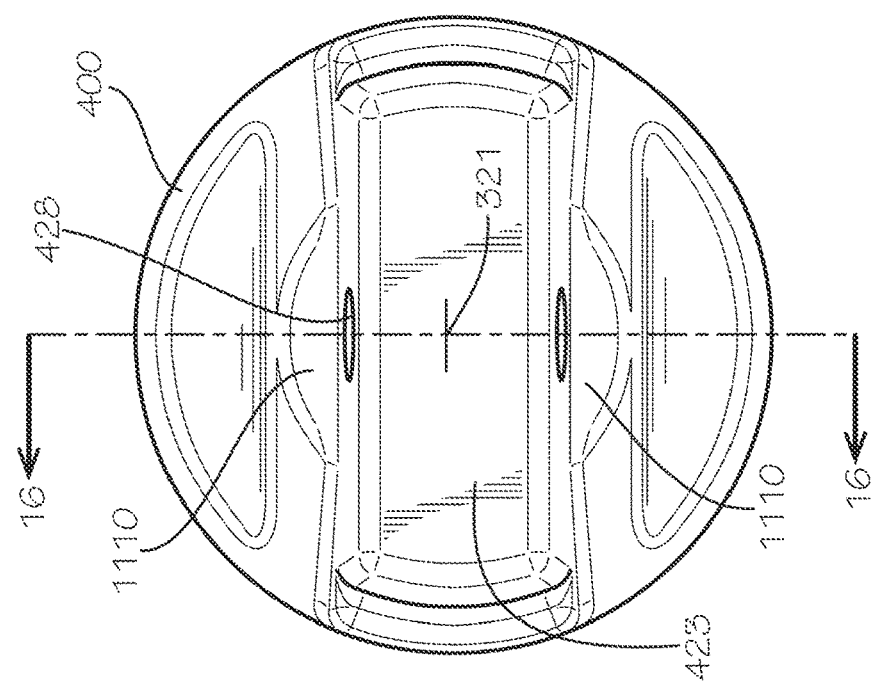
FIG. 14 is a top view of the cap and the stem of FIG. 11 in accordance with another aspect of the current disclosure in which the cap does not define a window.

Combinations of the cap 400 and the stem 300 according to other aspects of the disclosure are shown in FIGS. 11-16. As shown in FIGS. 11 and 12, the cap 400 and the stem 300 can be assembled—and the cap 400 secured to the stem 300—using a fastener 600 installed along the axis 321 of the stem 300 such as, for example and without limitation, a snap ring (shown in FIG. 13). An open end of the snap ring can be sized and shaped to snap around the stem 300. The cap 400, and in particular the base 410, the transition portion 430, and the rotation tab 420, can as desired define a step 1110 on either side or both sides of the rotation tab 420, which can allow for an enlarged stem engagement cavity 415 inside the cap 400. In some aspects, as shown, the cap 400 can define only the second window 460 in the top surface 423. The stem can thereby be made visible through the second window 460. In other aspects, as shown in FIG. 14, no window is present and an audible "click" or "snap" or other sound or a tactile feel of the fastener 600 snapping into "blind" engagement with the stem engagement cavity 415 of the cap can indicate proper positioning of the cap 400 with respect to the stem 300.

As shown in FIG. 13, the fastener 600 can be aligned with and pushed over the stem 300 until it is positioned inside the groove 810. The stem 300 can then be aligned with and the second end 306 inserted inside the cap 400.

Figure 15:
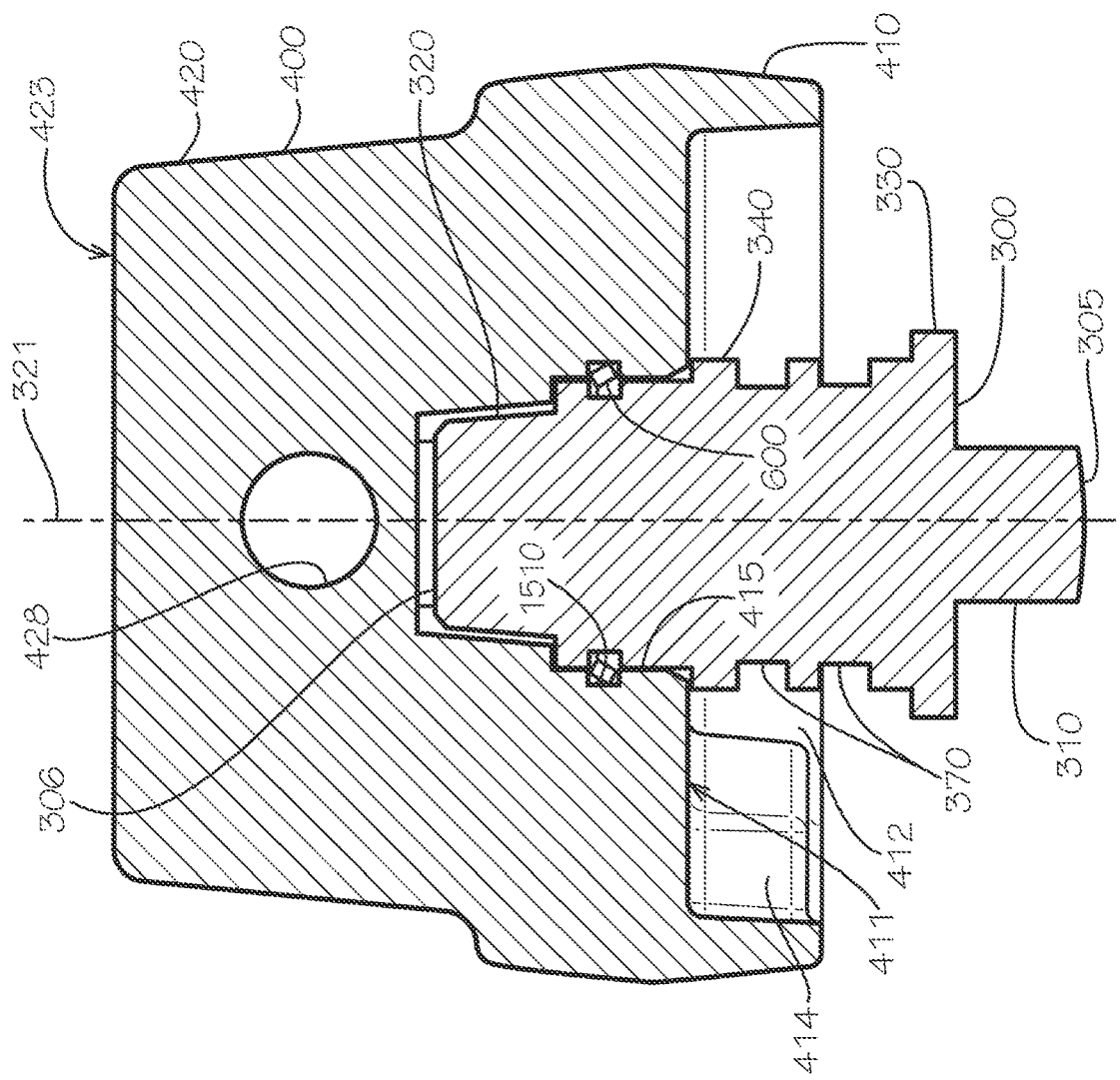
FIG. 15 is a sectional view of the cap and the stem of FIG. 11 taken along line 15-15 of FIG. 12.
Figure 16:
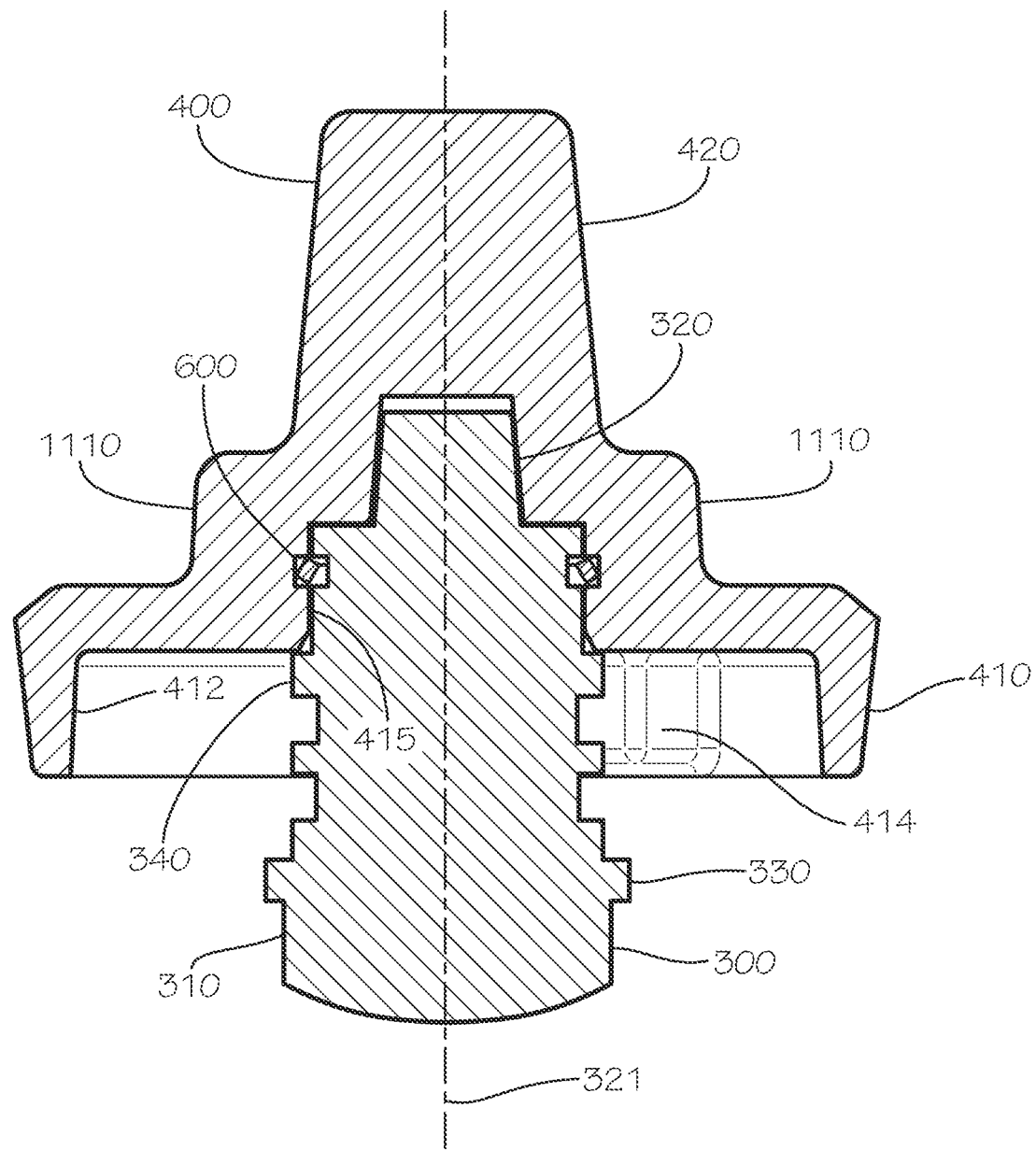
FIG. 16 is a sectional view of the cap and the stem of FIG. 11 taken along line 16-16 of FIG. 14.

As shown in FIGS. 15 and 16, the stem engagement cavity 415 can define a groove 1510 that can be sized to receive the fastener 600. More specifically, as shown, an open end of the fastener 600 can be sized and shaped to snap around the stem 300 at the groove 810 defined in the stem 300 and snap in and engage with the groove 1510 defined in the cap 400. Moreover, the fastener 600 can be angled in cross-section to install more easily in the stem engagement cavity 415. More specifically, as shown, a surface of the fastener 600 can be angled in cross-section with respect to both an axis of the fastener 600 and a plane angled at 90 degrees with respect to the axis of the fastener 600. Such an angled shape can also serve the purpose, as may be desired, of making removal of the cap 400 from the stem 300 more difficult. As shown, with no window defined in the cap 400, the stem engagement cavity 415 can terminate proximate to the second end 306 of the stem 300, including below the hole 428 as desired. Again, the fastener 600—in contact with the groove 1510—or the second flange 340—in contact with the inner surface 411—or both the fastener 600 and the second flange 340 can thereby hold the cap 400 captive to the stem 300.

A method of manufacturing a valve can comprise inserting the stem 300 of the valve 90 into the valve body 100 of the valve 90 through an end 105,106 of the valve body 100. The method can further comprise placing the cap 400 of the valve 90 over a second end 306 of the stem 300, where the second end 306 of the stem 300 can engage the stem engagement cavity 415 of the cap 400. The method can further comprise checking a vertical position of the stem 300 relative to the cap 400 through a window such as, for example and without limitation, the first window 450 defined in the cap 400. The method can further comprise exposing a surface of the stem 300 through the window.

Visibility of a surface of the stem 300 through a window in the cap such as the first window 450 or the second window 460 can help ensure proper alignment or positioning of the cap 400 with respect to the stem 300, which can reduce user complaints caused by hidden misalignment that is discovered later in the field. Hidden misalignment of the parts of the valve 90 can be troublesome to a user for at least the reason that repair or replacement of the valve 90 can be expensive, especially when the valve 90 is installed in a high-traffic location such as in or near a road or other traffic thoroughfare.

The method of inserting the stem 300 of the valve 90 into the valve body 100 can comprise pushing a second end 306 of the stem 300 through the stem bore 228 defined in the valve body 100. More specifically, a first end 305 of the stem 300 can remain captive within the valve body 100 and the second end 306 of the stem 300 can protrude from the valve body 100. The method can further comprise holding the stem 300 in position such that a flange such as the first flange 330 proximate to the first end 305 of the stem 300 can remain in contact with a portion of the interior cavity 103 of the valve body 100 proximate to the stem bore 128.

The method can further comprise setting the vertical position of the stem 300 relative to the cap 400 by visual confirmation through a window such as the window 450. In some aspects, the method can further comprise drilling the hole 480 through the cap 400 and the hole 380 through the stem 300 in a direction orthogonal to the stem axis 321 of the stem 300. The method can further comprise inserting the fastener 600 of the valve 90 into the hole to secure the cap 400 to the stem 300, such as when the fastener 600 is a pin. In other aspects, including when the fastener 600 is a retaining ring, the method can further comprise inserting the fastener 600 of the valve 90 into a groove 810 defined in the stem 300 such that the retaining ring is positioned inside the groove 810 of the stem 300 holds the cap 400 captive to the stem 300.

The method can further comprise placing the first O-ring 350 into a first annular groove 370 and the second O-ring 350 into the second annular groove 370. The method can further comprise pushing the second end 306 of the stem 300 through a stem bore 128 in the valve body 100, a first end 305 of the stem 300 remaining captive within the valve body 100 and a second end 306 of the stem 300 protruding from the valve body 100. The method can further comprise holding the stem 300 in position such that a flange such as the first flange 330 proximate to the first end 305 of the stem 300 remains in contact with a portion of an interior cavity 103 of the valve body 100 proximate to the stem bore 128.

The method can further comprise inserting an additional seal (not shown) of the valve 90 into the valve body 100 through the first end 105 of the valve body 100 such that the additional seal contacts a shoulder of the valve body 100 that is distal from the first end 105, a second sealing surface of the additional seal facing the first end 105 of the valve body 100. The method can further comprise inserting the valve sealing element 200 of the valve into the valve body 100 through the first end 105 of the valve body 100. Each of the first key 310 of the stem 300 and the stem recess 210 of the valve sealing element 200 can be parallel to the stem bore axis 121 of the valve body 100 during installation of the valve sealing element 200. The method can further comprise inserting the first seal 250 of the valve 90 into the valve body 100 through the first end 105 of the valve body 100 such that the first seal 250 contacts the valve sealing element 200, a first sealing surface 251 of the first seal 250 facing the valve sealing element 200.

In some aspects, the method can further comprise installing the body O-ring 900 (shown in FIG. 1) of the valve 90 over the end piece 500, including past the threads of the end piece 500. In other aspects, the method can further comprise inserting the body O-ring 900 into the valve body 100 through the first end 105 of the valve body 100 until the body O-ring 900 contacts a shoulder of the first end 105 of the valve body 100. The method can further comprise inserting the end piece 500 of the valve 90 into the valve body 100 through the first end 105 of the valve body 100, threads of the end piece 500 engaging first threads 133 of the first end 105 of the valve body 100, an end of the end piece 500 contacting and sealing against the body O-ring 900.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A valve comprising:
   a valve body defining a first end, a second end, an interior surface, and an exterior surface, the first end defining a first opening and the second end defining a second opening, the interior surface defining a main bore extending from the first opening to the second opening, the main bore defining a fluid path from the first opening to the second opening, the valve body comprising a stem portion defining a stem bore intersecting the main bore;
   a valve sealing element positioned inside the valve body;
   a stem positioned inside the stem bore of the valve body, the stem comprising a first end and a second end, the first end of the stem engaged with the valve sealing element; and
   a cap fixed with respect to the stem and thereby prevented from translational or rotational movement with respect to the stem, the cap comprising a mounting end and an actuating end; the mounting end defining a stem engagement cavity; the actuating end distal from the mounting end; and
   a fastener blindly engaged with the second end of the stem with the stem engagement cavity, engagement of the second end of the stem with the stem engagement cavity indicated by one of a sound and a tactile feel of the fastener snapping into engagement with the stem engagement cavity.

2. The valve of claim 1, wherein the valve sealing element comprises a ball.

3. The valve of claim 1, wherein the stem further defines a first flange proximate to the first end, a diameter of the first flange larger than a bore diameter of the stem bore, the stem being held captive inside the valve body.

4. The valve of claim 1, wherein the fastener is a snap ring.

5. The valve of claim 4, wherein the snap ring defines an open end engaged with the second end of the stem.

6. The valve of claim 4, wherein the stem further defines a groove, the snap ring received inside the groove of the stem to hold the snap ring captive to the stem.

7. The valve of claim 6, wherein the stem engagement cavity of the cap defines a groove, the snap ring received within the groove of the stem engagement cavity to hold the snap ring captive to the cap.

8. The valve of claim 7, wherein the snap ring is angled in cross-section with respect to both an axis of the snap ring and a plane angled at 90 degrees with respect to the axis of the snap ring to facilitate installation of the snap ring into the groove of the stem engagement cavity of the cap.

9. The valve of claim 1, wherein the cap comprises a rotation tab defining a first side surface and a second side surface.

10. The valve of claim 1, wherein the cap further comprises a locking tab configured to lock a rotational position of the cap with respect to the valve body.

11. A cap for a valve, the cap comprising:
    a mounting end defining a lower cavity and a stem engagement cavity therein, the stem engagement cavity defining a groove sized to receive a snap ring of a stem of the valve; and
    an actuating end distal from the mounting end.

12. The cap of claim 11, further comprising a rotation tab.

13. The cap of claim 11, wherein a portion of the stem engagement cavity is sized to receive and lock a rotational position of the stem with respect to the cap.

14. A method of assembling a valve, the method comprising:
    inserting a stem of the valve into a valve body of the valve through an end of the valve body, the stem defining a first end engaged with the valve body;
    securing a fastener to a second end of the stem; and
    placing a cap of the valve over the second end of the stem, the fastener engaging the cap.

15. The method of claim 14, wherein inserting a stem of the valve into the valve body comprises pushing a second end of the stem through a stem bore in the valve body, a first end of the stem remaining captive within the valve body and the second end of the stem protruding from the valve body.

16. The method of claim 15, further comprising holding the stem in position such that a flange proximate to the first end of the stem remains in contact with a portion of an interior cavity of the valve body proximate to the stem bore.

17. The method of claim 14, wherein the fastener engaging the cap comprises the fastener blindly engaging the cap.

18. The method of claim 14, wherein the fastener is a snap ring.

19. The method of claim 14, wherein securing the fastener to the second end of the stem comprises securing the fastener to a groove defined in the second end of the stem.

20. The method of claim 14, wherein the fastener engaging the cap comprises the fastener engaging a groove defined in the cap.

* * * * *